US012742868B2

(12) United States Patent
Shi et al.

(10) Patent No.: US 12,742,868 B2
(45) Date of Patent: Sep. 22, 2026

(54) AUTOMOTIVE RADAR WITH SPARSE ARRAY DOA ESTIMATION

(71) Applicant: NXP B.V., Eindhoven (NL)

(72) Inventors: Binbin Shi, Boston, MA (US); Jun Li, San Jose, CA (US); Ryan Haoyun Wu, San Jose, CA (US)

(73) Assignee: NXP B.V., Eindhoven (NL)

( * ) Notice: Subject to any disclaimer, the term of this patent is extended or adjusted under 35 U.S.C. 154(b) by 271 days.

(21) Appl. No.: 18/444,198

(22) Filed: Feb. 16, 2024

(65) Prior Publication Data

US 2025/0264597 A1 Aug. 21, 2025

(51) Int. Cl.

*G01S 13/42* (2006.01)
*G01S 7/35* (2006.01)
*G01S 13/931* (2020.01)

(52) U.S. Cl.

CPC .......... *G01S 13/426* (2013.01); *G01S 13/931* (2013.01); *G01S 7/356* (2021.05)

(58) Field of Classification Search

CPC ...... G01S 13/931; G01S 13/426; G01S 7/356; G01S 2013/0245; G01S 2013/0254
USPC .... 342/157, 158, 154, 81, 79, 373, 371, 368
See application file for complete search history.

(56) References Cited

U.S. PATENT DOCUMENTS 8,472,547 B2 * 6/2013 Hammarwall ......... H04B 7/065 375/267
8,494,033 B2 * 7/2013 Jongren ............... H04B 7/0617 375/267
9,281,881 B2 * 3/2016 Onggosanusi ....... H04B 7/0486
9,319,121 B2 * 4/2016 Onggosanusi ....... H04B 7/0469
9,541,638 B2 * 1/2017 Jansen .................. G01S 13/878
9,759,806 B2 * 9/2017 Kishigami ................ G01S 7/02
(Continued)

FOREIGN PATENT DOCUMENTS

EP 4050372 A1 8/2022

OTHER PUBLICATIONS

Li, Jun et al; "Bayesian Linear Regression with Cauchy Prior and Its Application in Sparse MIMO Radar"; Accepted for publication on IEEE Trans. On Aerospace and Electronic Systems; 23 pages (2022, downloaded from IEEE Xplore Oct. 25, 2023).
(Continued)

*Primary Examiner* — Michael W Justice

(57) ABSTRACT

A system and method for processing received radar signals is presented. A steering matrix for the radar system is determined. A measurement vector is determined using signals received by a plurality of receiver modules. An output amplitude vector is initialized using the steering matrix and the measurement vector. An optimized output amplitude vector is determined by determining a diagonal loading vector using the output amplitude vector, calculating a weighting matrix using a first fast Fourier transform of the diagonal loading vector, determining an inverse matrix using the weighting matrix and an identity matrix, and executing a second fast Fourier transform using the inverse matrix to determine the optimized output amplitude vector, wherein the optimized output amplitude vector is determined by a relationship between the steering matrix and the measurement vector. An objects direction of arrival is determined by correlating the optimized output amplitude vector to the measurement vector.

17 Claims, 6 Drawing Sheets

(56) References Cited

U.S. PATENT DOCUMENTS 10,845,463 B2 * 11/2020 Zhang .................. G01S 13/003
10,866,302 B2 * 12/2020 Wu ......................... H04W 4/33
10,890,652 B2 * 1/2021 Kishigami ............ G01S 13/288
10,965,038 B2 * 3/2021 Kishigami ............ G01S 13/284
11,609,306 B2 * 3/2023 Thiagarajan .......... G01S 7/4056
11,670,866 B2 * 6/2023 Kishigami .............. G01S 13/42 342/118
12,025,689 B2 * 7/2024 Hammes ................. G01S 7/282
12,422,538 B2 * 9/2025 Arkind .................... G01S 7/356
2011/0249637 A1 * 10/2011 Hammarwall ....... H04B 7/0481 370/329
2011/0249712 A1 * 10/2011 Hammarwall ....... H04B 7/0481 375/220
2011/0249713 A1 * 10/2011 Hammarwall ......... H04B 7/065 375/220
2011/0305263 A1 * 12/2011 Jöngren et al. ...... H04B 7/0663 375/296
2014/0226702 A1 * 8/2014 Onggosanusi ....... H04B 7/0487 375/267
2015/0204966 A1 * 7/2015 Kishigami .............. G01S 13/42 342/189
2016/0013845 A1 * 1/2016 Onggosanusi ....... H04B 7/0639 375/267
2016/0131752 A1 * 5/2016 Jansen .................... G01S 13/42 342/27
2020/0191913 A1 * 6/2020 Zhang ..................... G01S 7/412
2020/0271747 A1 * 8/2020 Wu ......................... G01P 15/18
2020/0400808 A1 * 12/2020 Hammes ................. G01S 13/42
2021/0124017 A1 * 4/2021 Thiagarajan ............ G01S 7/352
2022/0268883 A1 * 8/2022 Wu ........................... G01S 3/14
2022/0295883 A1 9/2022 Liu
2022/0349986 A1 * 11/2022 Wu ......................... G01S 7/354
2023/0375690 A1 * 11/2023 Arkind .................... G01S 7/356
2025/0035776 A1 * 1/2025 Emadi ................... G01S 7/2883

OTHER PUBLICATIONS

U.S. Appl. No. 17/185,084; not yet published; 44 pages (Feb. 25, 2021).

* cited by examiner

500
FIG. 5

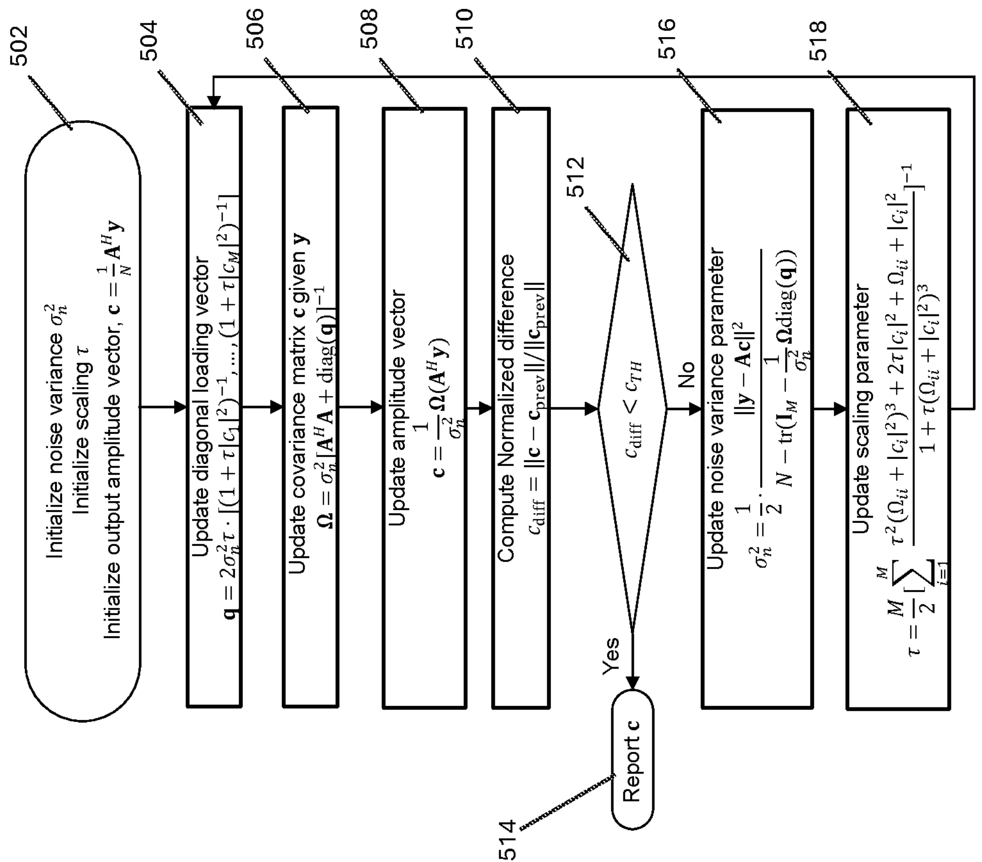
502
Initialize noise variance $\sigma_n^2$
Initialize scaling $\tau$
Initialize output amplitude vector, $\mathbf{c} = \frac{1}{N}\mathbf{A}^H\mathbf{y}$
504
Update diagonal loading vector
$\mathbf{q} = 2\sigma_n^2\tau \cdot [(1+\tau|c_1|^2)^{-1}, \ldots, (1+\tau|c_M|^2)^{-1}]$
506
Update covariance matrix c given y
$\mathbf{\Omega} = \sigma_n^2[\mathbf{A}^H\mathbf{A} + \mathrm{diag}(\mathbf{q})]^{-1}$
508
Update amplitude vector
$\mathbf{c} = \frac{1}{\sigma_n^2}\mathbf{\Omega}(\mathbf{A}^H\mathbf{y})$
510
Compute Normalized difference
$c_{\mathrm{diff}} = \|\mathbf{c} - \mathbf{c}_{\mathrm{prev}}\| / \|\mathbf{c}_{\mathrm{prev}}\|$
512
$c_{\mathrm{diff}} < c_{TH}$
Yes
No
514
Report c
516
Update noise variance parameter
$\sigma_n^2 = \frac{1}{2} \cdot \frac{\|\mathbf{y} - \mathbf{A}\mathbf{c}\|^2}{N - \mathrm{tr}(\mathbf{I}_M - \frac{1}{\sigma_n^2}\mathbf{\Omega}\mathrm{diag}(\mathbf{q}))}$
518
Update scaling parameter
$\tau = \frac{M}{2}[\sum_{i=1}^{M} \frac{\tau^2(\Omega_{ii} + |c_i|^2)^3 + 2\tau|c_i|^2 + \Omega_{ii} + |c_i|^2}{1 + \tau(\Omega_{ii} + |c_i|^2)^3}]^{-1}$

600
FIG. 6

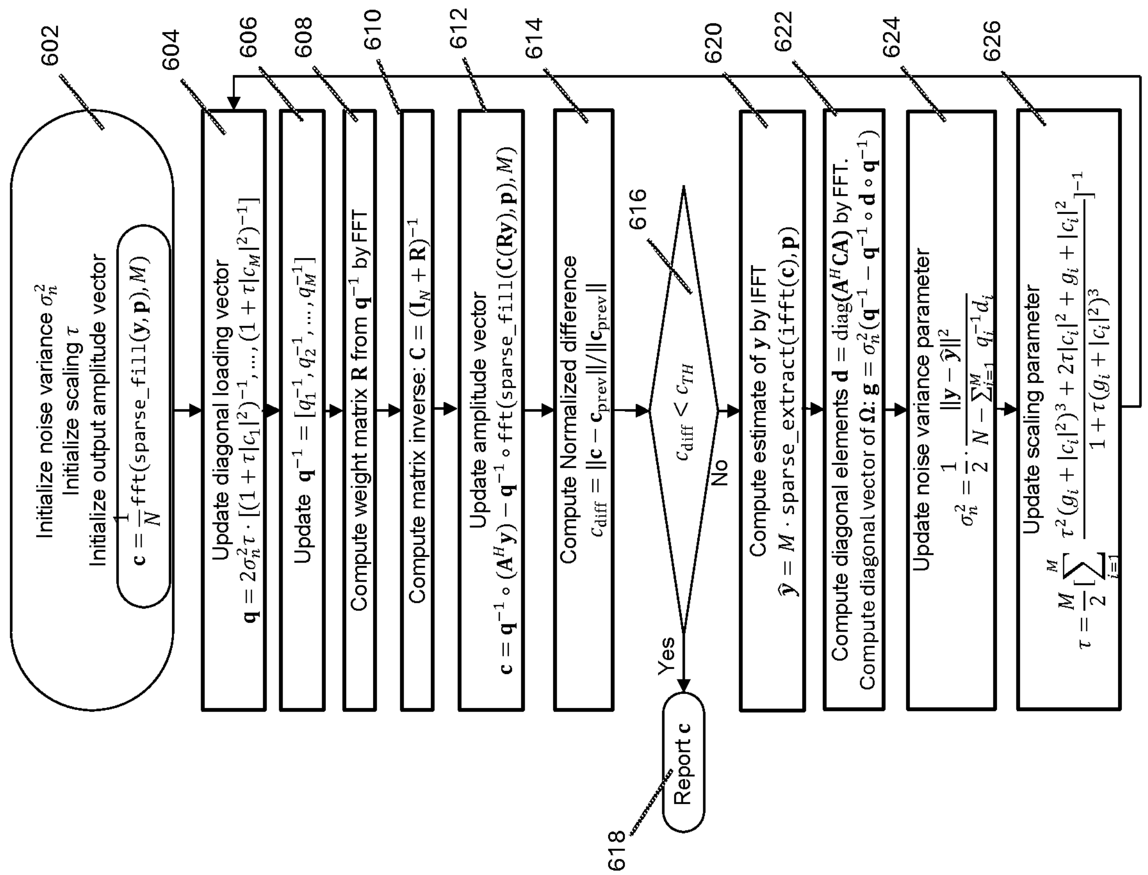
602
Initialize noise variance $\sigma_n^2$
Initialize scaling $\tau$
Initialize output amplitude vector
$\mathbf{c} = \frac{1}{N}\mathtt{fft}(\mathtt{sparse\_fill}(\mathbf{y}, \mathbf{p}), M)$
604
Update diagonal loading vector
$\mathbf{q} = 2\sigma_n^2\tau \cdot [(1+\tau|c_1|^2)^{-1}, \ldots, (1+\tau|c_M|^2)^{-1}]$
606
Update $\mathbf{q}^{-1} = [q_1^{-1}, q_2^{-1}, \ldots, q_M^{-1}]$
608
Compute weight matrix $\mathbf{R}$ from $\mathbf{q}^{-1}$ by FFT
610
Compute matrix inverse: $\mathbf{C} = (\mathbf{I}_N + \mathbf{R})^{-1}$
612
Update amplitude vector
$\mathbf{c} = \mathbf{q}^{-1} \circ (\mathbf{A}^H\mathbf{y}) - \mathbf{q}^{-1} \circ \mathtt{fft}(\mathtt{sparse\_fill}(\mathbf{C}(\mathbf{R}\mathbf{y}), \mathbf{p}), M)$
614
Compute Normalized difference
$c_{\mathrm{diff}} = \|\mathbf{c} - \mathbf{c}_{\mathrm{prev}}\| / \|\mathbf{c}_{\mathrm{prev}}\|$
616
$c_{\mathrm{diff}} < c_{TH}$
Yes
No
Report $\mathbf{c}$
618
620
Compute estimate of $\mathbf{y}$ by IFFT
$\hat{\mathbf{y}} = M \cdot \mathtt{sparse\_extract}(\mathtt{ifft}(\mathbf{c}), \mathbf{p})$
622
Compute diagonal elements $\mathbf{d} = \mathrm{diag}(\mathbf{A}^H\mathbf{C}\mathbf{A})$ by FFT.
Compute diagonal vector of $\mathbf{\Omega}$: $\mathbf{g} = \sigma_n^2(\mathbf{q}^{-1} - \mathbf{q}^{-1} \circ \mathbf{d} \circ \mathbf{q}^{-1})$
624
Update noise variance parameter
$\sigma_n^2 = \frac{1}{2} \cdot \frac{\|\mathbf{y} - \hat{\mathbf{y}}\|^2}{N - \sum_{i=1}^{M} q_i^{-1} d_i}$
626
Update scaling parameter
$\tau = \frac{M}{2}\left[\sum_{i=1}^{M} \frac{\tau^2(g_i + |c_i|^2)^3 + 2\tau|c_i|^2 + g_i + |c_i|^2}{1 + \tau(g_i + |c_i|^2)^3}\right]^{-1}$

AUTOMOTIVE RADAR WITH SPARSE ARRAY DOA ESTIMATION

TECHNICAL FIELD

The present disclosure is directed in general to radar systems and associated methods of operation. In one aspect, the present disclosure relates to a multiple-input, multiple-output (MIMO) radar system, such as a civil automotive radar system, configured to perform direction of arrival (DOA) analysis using an optimized Bayesian Linear Regression with Cauchy Prior (BLRC) algorithm.

BACKGROUND

A radar system, such as an automotive radar system that may be used in civil automotive applications, transmits an electromagnetic signal and receives back reflections of the transmitted signal. The time delay and/or time delay variation between the transmitted and received signals can be determined and used to calculate the distance and/or the speed of objects, such as cars, trucks, motorcycles, traffic signs, roadway fixtures, and the like, causing the reflections, respectively. For example, in civil automotive applications, automotive radar systems can be used to determine the distance and/or the speed of oncoming vehicles and other obstacles.

Automotive radar systems enable the implementation of advanced driver-assistance system (ADAS) functions that are likely to enable increasingly safe driving and, eventually, fully autonomous driving platforms. Such systems use radar systems as the primary sensor for ADAS operations.

In a radar system, signal processing requires the analysis of range-Doppler datasets when determining the direction of arrival (DOA) of objects represented in those datasets. In radar systems, this processing requires the manipulation of large data sets requiring significant computer and memory requirements, which can increase the cost and complexity of such radar systems.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a flow chart depicting a method for implementing a BLRC algorithm for DOA estimation.

FIG. 6 is a flow chart depicting an optimized method for implementing a BLRC algorithm for DOA estimation that exhibits reduced computing power and memory storage requirements compared to conventional approaches.

DETAILED DESCRIPTION

Figure 1:
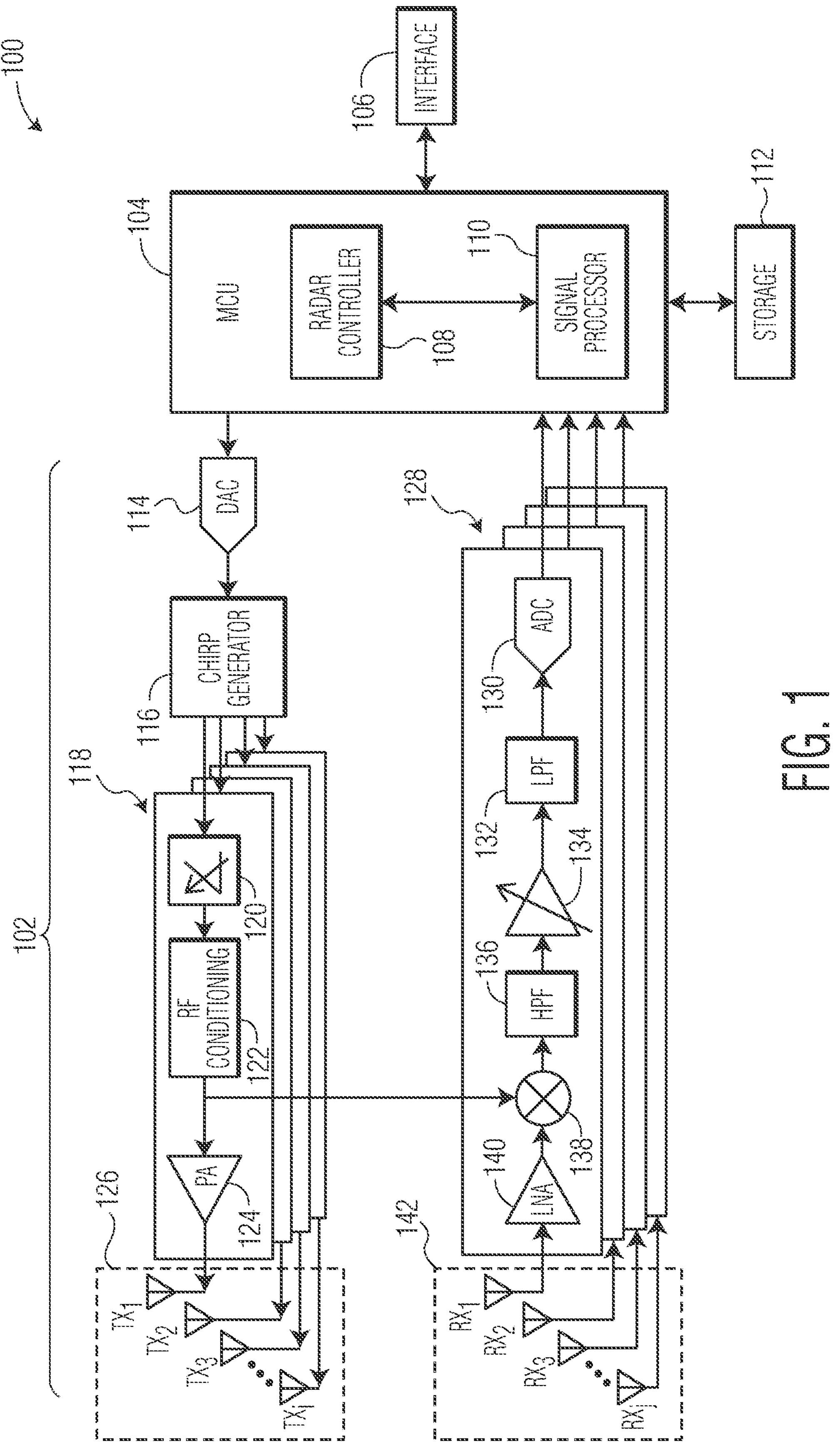
FIG. 1 shows a block diagram of a MIMO automotive radar system.

The following detailed description is merely illustrative in nature and is not intended to limit the embodiments of the subject matter of the application and uses of such embodiments. As used herein, the words “exemplary” and “example” mean “serving as an example, instance, or illustration.” Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

Automotive radar systems, such as those used in civil automotive applications, are used to support advanced driver-assistance system (ADAS) functions like assisted cruise control, emergency braking, blind spot monitoring, and alerts. Various embodiments described herein relate to Multiple-Input Multiple-Output (MIMO) radar systems with integrated object or obstacle tracking capabilities including a capability of determining direction of arrival (DOA) of detected objects.

In one or more embodiments, an example radar system as may be used in an automotive application and includes a microcontroller unit (MCU) having a signal processor configured to generate a range-Doppler data set from, for example, raw analog-to-digital (ADC) samples derived from return signals (i.e., reflections) corresponding to reflections of transmit signals (e.g., chirps) transmitted via transmitter (TX) antenna elements of the radar system (e.g., in accordance with a Doppler division scheme having, for example, a uniform pulse repetition interval (PRI)), where the return signals are received via receiver (RX) antenna elements of the radar system. For example, the range-Doppler data sets may be generated by performing range compression (e.g., in the form of a fast-time Fast Fourier transform (FFT)) and Doppler compression (e.g., in the form of a slow-time FFT) on raw ADC samples output by one or more ADCs of receiver modules of the radar system. The signal processor may then perform per-channel DOA estimation by performing a channel dimension FFT for each range-Doppler cell of the range-Doppler data set to generate a respective FFT output matrix for each range bin. The signal processor may then perform DDM decoding based on the FFT output matrices to generate a decoded range-Doppler bit map (RDBM), where each row of the RDBM corresponds to a respective FFT output matrix of the FFT output matrices and, therefore, a respective range bin of the range-Doppler data set. While one or more embodiments described herein involve the use of FFTs, it should be understood that this is intended to be illustrative and not limiting. Other suitable techniques for carrying out Discrete Fourier Transforms (DFTs) may instead be used in accordance with one or more other embodiments.

Standard DOA estimation approaches require the manipulation of the large matrices making up the range-Doppler data, which can result in considerable processor and data storage requirements for such systems. For example, some DOA estimation approaches utilize a Bayesian Linear Regression with Cauchy Prior (BLRC) as a super-resolution DOA estimator. Use of BLRC as a super-resolution estimator can be beneficial for processing range-Doppler data sets generated using arbitrary antenna array geometry, which can be found in vehicle radar system applications. In such a case, the sizable sparse arrays generated by range-Doppler processing can include a large number of missing elements.

These missing elements can generate spurious sidelobes if processed using traditional beamforming method, which is mitigated by the use of BLRC processing algorithms.

Even so, a difficulty with existing BLRC-based DOA estimation approaches resides in the BLRC algorithm's requirement for substantial memory and computing power. Conventional BLRC processing, for example, typically requires $\mathcal{O}(M^3)$ computation and $\mathcal{O}(M^2)$ memory due to large-scale matrix operations required by such algorithms. These values scale exponentially with the number of bins of the angular spectrum at the output of the BLRC algorithm, M. Consequently, due to the large memory footprint requirement and heavy compute burden of conventional BLRC implementations, for edge computing hardware with limited resources, the conventional BLRC's applicability is limited to small-sized arrays incompatible with modern vehicle radar systems, which exhibit high angular resolution. In order to apply BLRC to larger-array imaging radar use cases for producing high-resolution angle information, it is desirable that the memory footprint and compute efficiency of such methods be improved.

In the present disclosure, therefore, a novel implementation of the BLRC algorithm is provided that achieves reduced memory and computer requirements compared to conventional BLRC algorithms. Unlike conventional BLRC, the present "fast" BLRC (referred to in this disclosure as "fastBLRC") requires only $\mathcal{O}(N^3+M \log M)$ computation and $\mathcal{O}(N^2+M)$ memory in which N is the number of virtual antennas generated data input to the fastBLRC algorithm. Since N is much smaller than M in practice (e.g., in a typical radar system N=32 and M=512), by reducing the dependency on the factor M, the overall complexity and memory requirements of fastBLRC are reduced compared to conventional BLRC, as described herein.

FIG. 1 shows a block diagram of a MIMO automotive radar system 100 that includes a MIMO radar device 102 connected to a radar microcontroller unit (MCU) 104. In one or more embodiments, the device 102 may be a linear frequency modulation (LFM) DDM MIMO radar device. In one or more embodiments, the MIMO radar device 102 may be embodied as a line-replaceable unit (LRU) or modular component that is designed to be replaced quickly at an operating location. Similarly, the radar MCU 104 may be embodied as a line-replaceable unit (LRU) or modular component. Although a single or mono-static MIMO radar device 102 is shown, it will be appreciated that additional distributed radar devices may be used to form a distributed or multi-static radar. In addition, the depicted radar system 100 may be implemented in integrated circuit form with the MIMO radar device 102 and the radar MCU 104 formed with separate integrated circuits (chips) or with a single chip, depending on the application.

The radar device 102 includes transmitting antenna elements 126 (sometimes referred to herein as "transmit antennas 126") and receiving antenna elements 142 (sometimes referred to herein as "receive antennas 142") connected, respectively, to radio frequency (RF) transmitter (TX) modules 118 and receiver (RX) modules 128. Each transmit antenna 126 and TX module may be associated with a respective transmit channel of a group of transmit channels designated herein as $TX_1$, $TX_2$, $TX_3$, . . . $TX_i$, where "i" is the total number of transmit (TX) channels. Each receive antenna 142 and RX module 128 may be associated with a respective receive channel of a group of receive channels designated herein as $RX_1$, $RX_2$, $RX_3$, . . . $RX_j$, where "j" is the number of receive (RX) channels. As a non-limiting example, a radar device (e.g., the radar device 102) can include individual antenna elements (e.g., antenna elements 126) connected, respectively, to four transmitter modules (e.g., the transmitter modules 118) and sixteen receiver modules (e.g., the receiver modules 128). The numbers of transmitter and receiver antenna elements and modules are intended to be illustrative and not limiting, with other numbers of these elements being possible in one or more other embodiments, such as four transmitter modules 118 and six receiver modules 128, or a single transmitter module 118 and/or a single receiver module 128. The radar device 102 includes a chirp generator 116, which is configured to supply chirp input signals to the transmitter modules 118. To this end, the chirp generator 116 is configured to receive input program and control signals, including, as non-limiting examples, a reference local oscillator (LO) signal, a chirp start trigger signal, and program control signals, from the MCU 104 via a digital-to-analog converter 114. The chirp generator 116 is configured to generate chirp signals and send the chirp signals to the transmitter modules 118 for transmission via the transmitting antenna elements 126. In one or more embodiments, each transmitter module includes a phase rotator 120 (sometimes referred to herein as a "phase shifter 120") that is configured to apply phase coding to the chirp signals, where the phase rotator 120 is controlled by program control signals generated by the MCU 104. The phase rotator 120 may provide a uniform phase shift between transmitter modules 118 in one or more embodiments. The phase rotator 120 may alternatively provide each transmitter module 118 with the ability to implement progressive phase shifting using a non-uniform coding technique, in accordance with one or more other embodiments. Each transmitter module 118 includes an RF conditioning module 122 that is configured to filter the phase-coded chirp signals.

Each transmitter module 118 includes a power amplifier 124 configured to amplify the filtered, phase-coded chirp signal before they are provided to and transmitted via one or more corresponding transmitting antenna elements 126. By using each transmit antenna 126 to transmit progressively phase shifted sequences of chirp signals, each transmitter module 118 operates in a Doppler Division Multiplexing fashion with other transmitter modules of the transmitter modules 118 because they are programmed to simultaneously transmit identical waveforms on a phase-separated schedule. Herein, a transmitted chirp signal is sometimes referred to as a "transmit signal".

The radar signal transmitted by the transmitter antenna modules 118 may by reflected by an object or obstacle (this is sometime referred to in the field of automotive radar system as a "target object" which refers to a particular object about which the radar system is gathering information to provide appropriate driver assistance) in an environment of the radar device 102, and part of the reflected radar signal, sometimes referred to herein as a "return signal" or a "reflection", is received by the receiver antenna modules 128 at the radar device 102. At each receiver module 128, the received (radio frequency) antenna signal is amplified by a low noise amplifier (LNA) 140 and then fed to a mixer 138 where it is mixed with the transmitted chirp signal generated by the RF conditioning module 122. The resulting intermediate frequency signal is fed to a high-pass filter (HPF) 136. The resulting filtered signal is fed to a variable gain amplifier 134, which amplifies the signal before feeding it to a low pass filter (LPF) 132. This re-filtered signal is fed to an analog/digital converter (ADC) 130 and is output by each receiver module 128 (e.g., output to the signal processor 110 of the MCU 104) as a digital signal. In this way, the receiver modules 128 compress the echo of various delays into multiple sinusoidal tones whose frequencies correspond to the round-trip delay of the echo.

In the radar system 100, the radar MCU 104 may be connected and configured to supply input control signals to the radar device 102 and to receive therefrom digital output signals generated by the receiver modules 128. In one or more embodiments, the radar MCU 104 includes a radar controller 108 and a signal processor 110, where either or both of which may be embodied as a micro-controller unit (MCU) or other processing unit. The radar controller 108 can receive data from the radar device 102 (e.g., from the receiver modules 128) and can control radar parameters of the radar device 102, such as frequency band, length of each radar frame, and the like via the DAC 114. For example, the DAC 114 may be used to adjust the radar chirp signals output from the chirp generator 116 included in the radar device 102. The signal processor 110 may be configured and arranged for signal processing tasks such as, but not limited to, object identification, computation of the distance or range to an object, computation of the radial velocity of an object, and computation of the DOA of signals reflected by an object, and the like. Herein, the term "DOA" or "direction of arrival" (sometimes referred to as "AOA" or "Angle-of-Arrival") refers to the angle of a signal (e.g., a radar signal) that is reflected by an object in the environment. The signal processor 110 can provide calculated values associated with such computations to a storage 112 and/or to other systems via an interface 106.

The interface 106 can enable the MCU 104 to communicate with other systems over local and wide area networks, the internet, automotive communication buses, and/or other kinds of wired or wireless communication systems, as non-limiting examples. In one or more embodiments, the MCU 104 can provide the calculated values over the interface 106 to other systems, such as a radar-camera-lidar fusion system; an automated driving assistance system including parking, braking, or lane-change assistance features; and the like. The storage 112 can be used to store instructions for the MCU 104, received data from the radar device 102, calculated values from the signal processor 110, and the like. Storage 112 can be any suitable storage medium, such as a volatile or non-volatile memory.

To control the transmitter modules 118, the radar controller 108 may, for example, be configured to generate transmitter input signals, such as program, control trigger, reference LO signal(s), calibration signals, frequency spectrum shaping signals (such as ramp generation in the case of FMCW radar). The radar controller may, for example, be configured to receive data signals, sensor signals, and/or register programming or state machine signals for RF (radio frequency) circuit enablement sequences. In one or more embodiments, the radar controller 108 may be configured to program the transmitter modules 118 with transmitter input signals to operate in a DDM fashion by progressively phase shifting the LFM chirps to be transmitted by the transmit antenna elements 126. In selected embodiments, the radar controller 108 is configured to progressively phase shift the LFM chirps that are output by the chirp generator 116 with co-prime-coded (CPC) encoding by programming the programmable phase rotator 120 prior to transmission. Each transmitter module 118 emits a transmit channel signal having a different CPC encoded LFM signal generated using a programmable slow-time phase rotator 120, such that the receiver modules 128 can condition the object return signals (i.e., return signals corresponding to reflections of transmit signals that are transmitted via the transmit antenna elements 126, reflected off of one or more objects, where the return signals are then received via the receive antenna elements 142) to generate digital domain signals which are processed by the radar MCU 104 to separate and identify the CPC-encoded transmit channel signals.

At each receiver module 128, digital output signals are generated from reflected return signals for digital processing by the signal processor 110 to construct and accumulate multiple-input multiple-output (MIMO) array vector outputs forming a MIMO aperture for use in computing plots or maps for DOA estimation and object tracks. In particular, in the signal processor 110, the digital output signals may be processed by one or more fast Fourier transform (FFT) modules or Discrete Fourier Transform (DFT) modules, such as a fast-time (range) FFT module which generates a range chirp antenna cube (RCAC) and a slow-time (Doppler) FFT module which generates a range-Doppler antenna cube. A per-channel DOA estimation module of the signal processor 110 may then perform a respective channel dimension FFT on each range bin of the range-Doppler antenna cube to produce a number of FFT or DFT output matrices (i.e., one per range bin of the range-Doppler antenna cube). A DDM decoder module of the signal processor 110 may then generate a decoded range-Doppler bit map (RDBM) based on the FFT or DFT output matrices, as will be described in more detail, below. The decoded RDBM may be further processed by the signal processor 110 to construct a DDM MIMO array vector which the signal processor 110 then processes to perform DOA estimation and object tracking. The MCU 104 may then output the resulting object tracks (e.g., via the interface 106) to other automotive computing or user interfacing devices for further process or display.

Figure 2:
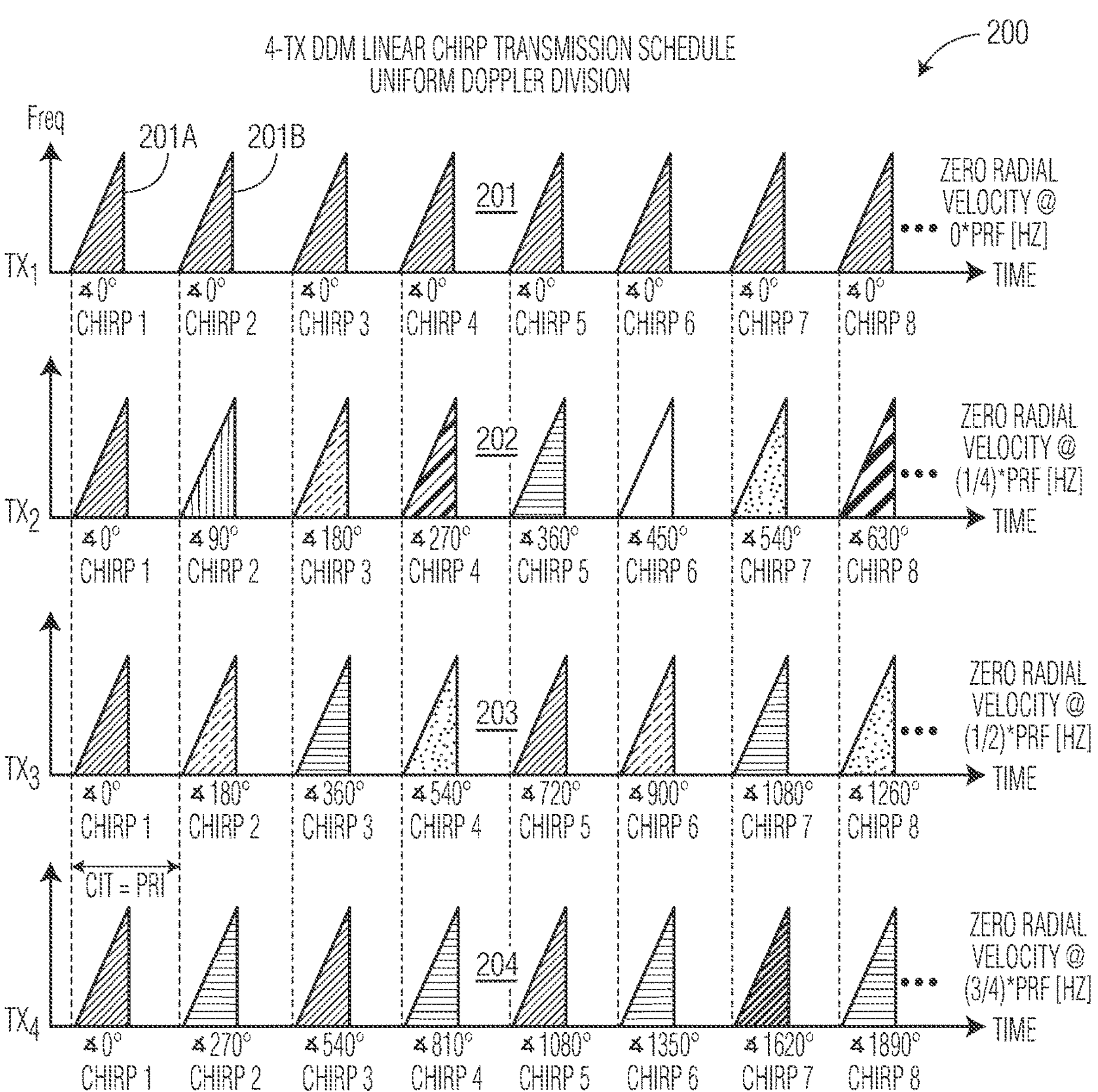
FIG. 2 depicts a timing diagram that may be used to determine a sequence of signals transmitted by a MIMO radar system.

For a contextual understanding of the operation of an MIMO radar system, such as the radar system 100 of FIG. 1, reference is now made to FIG. 2 which shows a timing diagram 200 illustrating example linear chirp transmission schedules 201, 202, 203, 204 of four transmitters (e.g., each respectively corresponding, in one or more embodiments, to a transmitter module 118 and transmit antenna element 126 of FIG. 1) using a uniform Doppler Division multiplexing (DDM) scheme for implementation of a MIMO antenna radar system. In the example implementation, each transmitter is associated with a respective transmit channel of the transmit channels $TX_1$-$TX_4$ and is programmed to simultaneously transmit a sequence of DDM linear chirp waveforms in a single radar transmission frame. Each transmitter transmits a linear chirp waveform (e.g., 201A, 201B) at a fixed and uniform pulse repetition frequency (PRF) rate which is the inverse of the pulse repetition interval (e.g., PRF=PRI−1) or chirp interval time (e.g., PRF=CIT−1). In addition, each transmitter encodes each chirp with an additional progressive phase offset by using the phase rotator in the front-end circuit. As a result of the progressive phase offset coding, each of the received chirps corresponding to reflections of radar signals originating from each distinct transmitter effectively has a distinct zero-radial velocity Doppler shift and the individual object detections can be associated with the corresponding transmitter from which the reflected radar signal originated, which is necessary for the correct functioning of the subsequent MIMO virtual array construction.

The location of the zero-radial velocity is controlled by the progressive phase offset applied to each transmitter's chirp based on the following equation:

$$f_{zrv,i} = \frac{A_i}{2\pi} PRF \text{ [Hz]}$$

where $f_{zrv,i}$ is the zero-radial velocity Doppler shift frequency of transmitter-i, and where $A_i$ is the progressive phase shift (radians) between two adjacent chirps. For example, in a 4-TX DDM MIMO radar system, each transmitter could be assigned the following progressive phase offsets and thus the zero-radial velocity frequencies:

$$TX_1\colon A_1 = 0 \rightarrow f_{zrv,1} = 0 \text{ [Hz]};$$

$$TX_2\colon A_2 = \frac{\pi}{2} \rightarrow f_{zrv,2} = \frac{PRF}{4} \text{ [Hz]};$$

$$TX_3\colon A_3 = \pi \rightarrow f_{zrv,3} = \frac{PRF}{2} \text{ [Hz]};$$

$$TX_4\colon A_4 = \frac{3\pi}{2} \rightarrow f_{zrv,4} = \frac{3*PRF}{4} \text{ [Hz]}.$$

In the present example, this result is depicted with the first transmitter, for transmit channel $TX_1$, encoding its chirp waveforms with a progressive phase offset of 0 degrees; the second transmitter, for transmit channel $TX_2$, encoding its chirp waveforms with a progressive phase offset of 90 degrees; the third transmitter, for transmit channel $TX_3$, encoding its chirp waveforms 20 with a progressive phase offset of 180 degrees; and the fourth transmitter, for transmit channel $TX_4$, encoding its chirp waveforms with a progressive phase offset of 270 degrees. In a DDM MIMO radar system with uniform Doppler division, objects can be unambiguously associated to the correct transmitter and TX channel by judging its location within the sectorized Doppler spectrum, provided that the objects have true Doppler shifts within ±PRF/($2N_{eh}$) before applying DDM, where $N_{ch}$ is the number of DDM transmitter channels.

Figure 3:
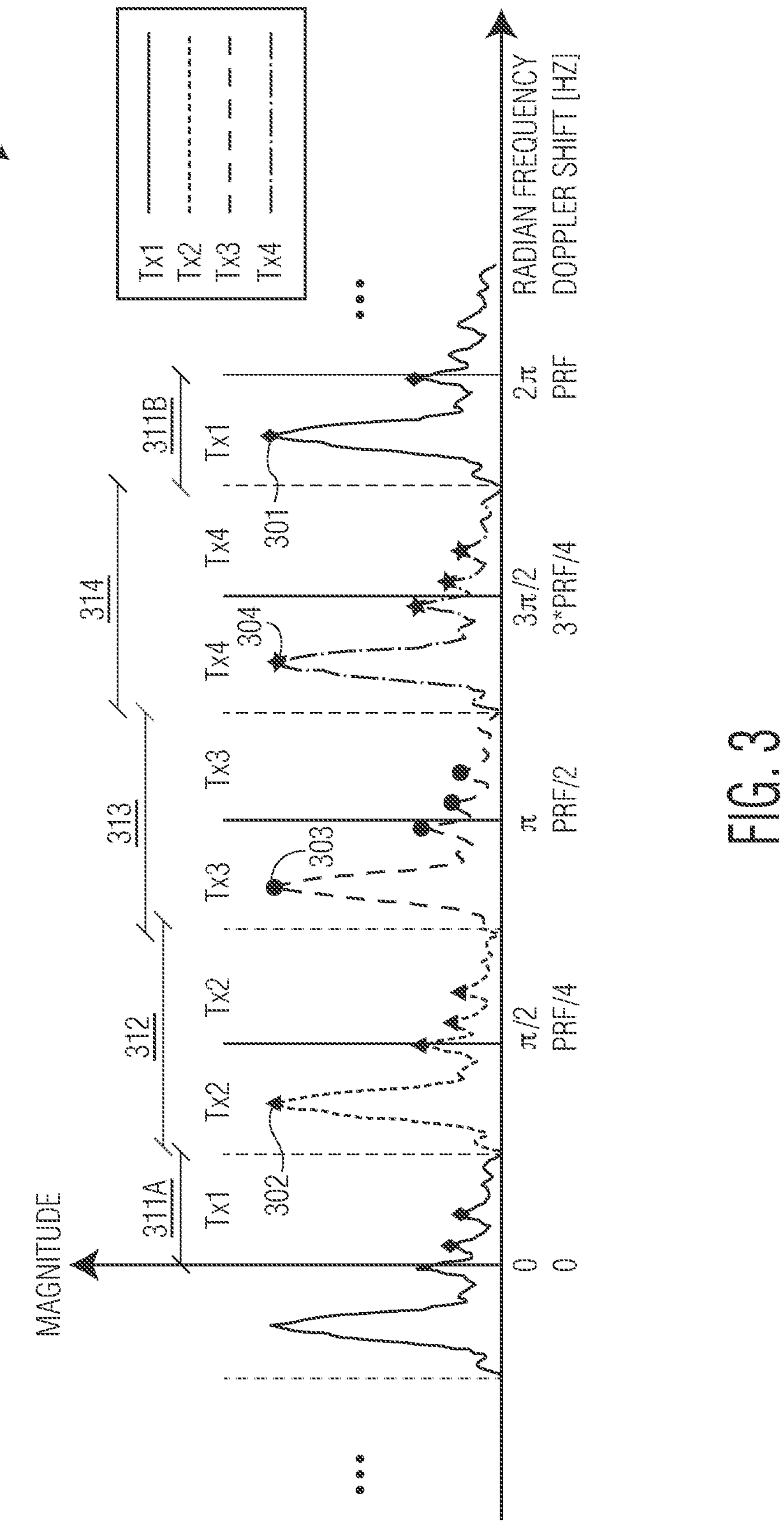
FIG. 3 depicts a plot of the Doppler spectrum as a function of the radian frequency (and Doppler shift) for a uniform DDM-MIMO radar system.

To illustrate the principle of Doppler-peak detection and transmitter association, reference is now made to FIG. 3 which depicts a plot of the Doppler spectrum as a function of the radian frequency (and Doppler shift) for a uniform DDM-MIMO radar system (e.g., an example embodiment of the radar system 100 of FIG. 1) where the maximum radial velocity of the objects does not exceed the allocated spectrum budget, resulting in unambiguous association of detected peaks with corresponding transmit antennas. As depicted, each transmitter channel TX1-TX4 has a respective allocated spectrum section 311, 312, 313, 314 which is effectively centered around a corresponding zero-radial velocity frequency (e.g., 0, π/2, π, and 3π/2). As a result, each object measurement 301, 302, 303, 304 having a true Doppler shift within ±PRF/(2Nch) of the zero-radial velocity frequency for each transmitter channel TX1-TX4 can be unambiguously associated to the correct transmitter by judging its location within the sectorized Doppler spectrum 300. This result holds true while the object's radial speed falls within the allocated spectral budget sections 311, 312, 313, 314 for each transmitter channel TX1-TX4. As shown, the spectral budget section 311 for the transmitter channel TX1 may be split into sections 311A, occurring at the beginning of the period, and 311B, occurring at the end of the period.

Figure 4:
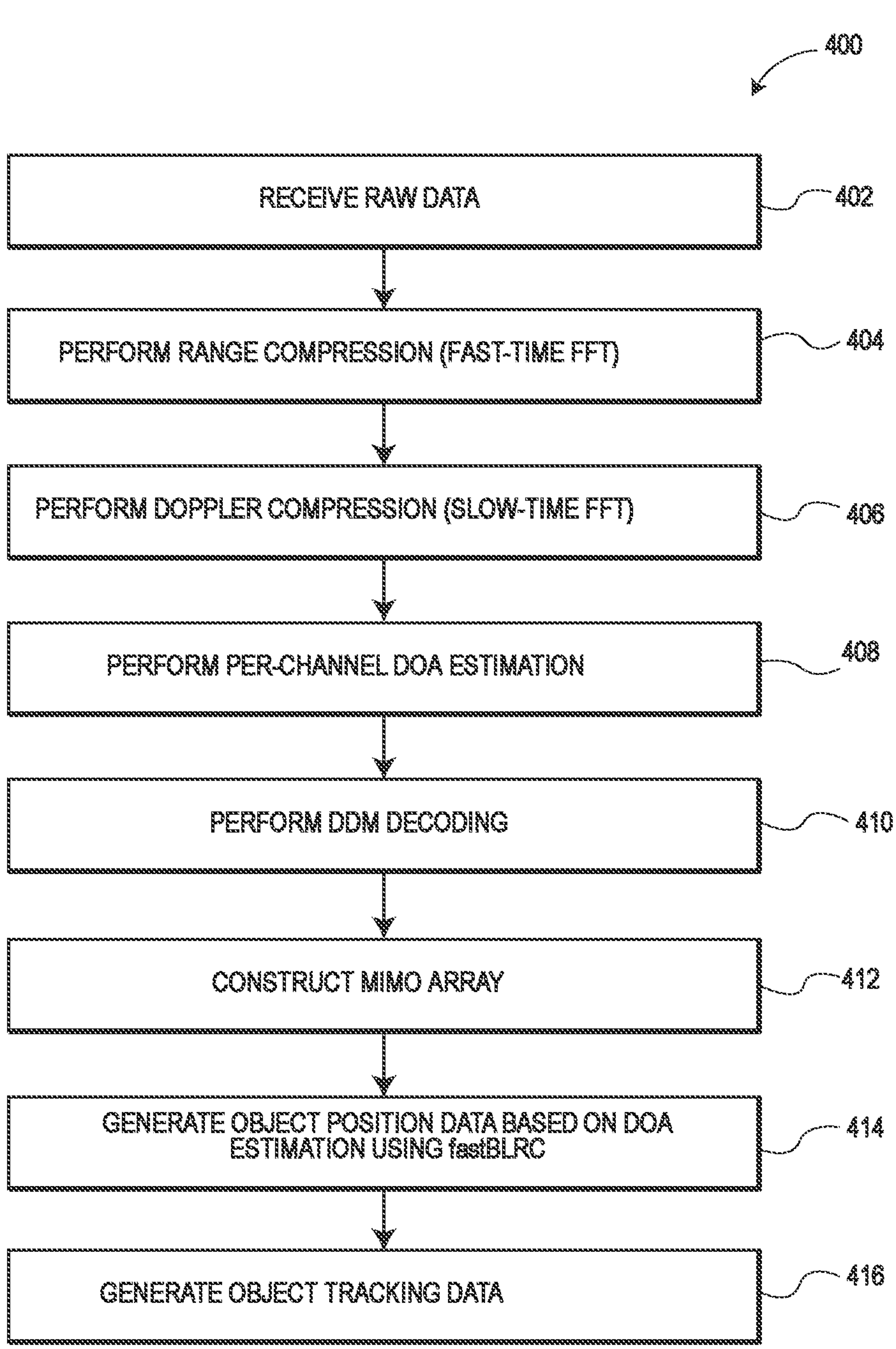
FIG. 4 is a flowchart depicting a method for processing raw data corresponding to sampled return signals corresponding to reflections of transmitted signals that are reflected by objects in an environment around a DDM-MIMO radar system.

FIG. 4 shows an illustrative process flow for a method 400 in accordance with the present disclosure by which raw data corresponding to sampled return signals corresponding to reflections of transmitted signals (e.g., chirps transmitted in accordance with a DDM scheme, such as that shown in the timing diagram 200 of FIG. 2) that are reflected by objects in an environment around a MIMO radar system (e.g., a vehicle radar system).

The method 400 may be performed using either or both of a radar controller and signal processor of a radar MCU, in accordance with one or more embodiments. The method 400 is described with reference to elements of the radar system 100 of FIG. 1. However, it should be understood that this is illustrative and not limiting, at least in that other suitable radar systems may be used to carry out the method 400 in one or more other embodiments.

At block 402, the signal processor 110 of the MCU 104 of the radar system 100 receives raw sample data (sometimes referred to as "ADC samples") from one or more ADCs 130 of the receiver modules 128. These ADC samples may be output by the ADCs 130 as digital signals. These ADC samples represent received signals (sometimes referred to as "reflected signals" or "return signals") corresponding to reflections of transmit signals (i.e., chirps) transmitted by the transmitter modules 118 via the transmit antenna elements 126 (e.g., in accordance with a DDM scheme, such as the DDM scheme shown in the timing diagram 200 of FIG. 2), where the transmit signals are reflected off of one or more objects in the environment of the radar system 100 (e.g., other vehicles, trucks, roadway obstacles). The return signals are received by the receiver modules 128 via the receive antenna elements 142.

At block 404, the signal processor 110 performs range compression of the raw ADC samples by performing a fast-time FFT or DFT on the raw ADC samples, for example. The signal processor 110 may generate a range chirp antenna cube (RCAC) as an output of this fast-time FFT or DFT.

At block 406, the signal processor 110 performs Doppler compression of the RCAC by performing a slow-time FFT or DFT on the RCAC, for example. The signal processor 110 may generate a range-Doppler antenna cube as an output of this slow-time FFT or DFT. The range-Doppler antenna cube may be a three-dimensional array having dimensions m×n×p, where m represents the number of Doppler bins, n represents the number of range bins, and p represents the number of RX channels (e.g., corresponding to the number of receive antenna elements 142 or the number of receiver modules 128) represented in the range-Doppler antenna cube. Herein, p is sometimes referred to as the "channel dimension" in the context of the range-Doppler antenna cube and range bin matrices extracted therefrom.

Each element of the range-Doppler antenna cube may encode the complex amplitude of a received signal for a particular range bin, Doppler bin, and RX channel. In one or more embodiments, a given RX channel slice of the range-Doppler antenna cube may be represented as a two-dimensional (2D) array of range-Doppler cells, with the complex amplitude of each cell corresponding to the average complex amplitude within a region bound, in Cartesian space, by corresponding pairs of iso-Doppler lines and iso-range lines. That is, the boundaries of each range bin are defined by a corresponding pair of iso-range lines and the boundaries of each Doppler bin are defined by a corresponding pair of iso-Doppler lines. Each range-Doppler cell corresponds to a respective Doppler bin and range bin pair.

Because the transmitter modules 118 transmit chirps simultaneously in a DDM-MIMO radar system, information from all TX channels is represented in each element in the range-Doppler antenna cube. Each range bin represents ranges or distances between the radar system and an object.

Each Doppler bin represents Doppler shift values corresponding to velocities at which an object may be traveling (e.g., relative to the ego velocity of the radar system 100). Such velocities may be calculated based on the determined Doppler shift associated with the object.

At block 408, the signal processor 110 performs per-channel (e.g., per-RX-channel) DOA estimation using the range-Doppler antenna cube. In one or more embodiments, the signal processor 110 performs the per-channel DOA estimation by extracting range bins from the range-Doppler antenna cube and performing a channel dimension FFT or DFT on each range-Doppler cell of the extracted range bin to generate FFT or DFT output matrices (i.e., with each FFT or DFT output matrix corresponding to a respective range bin of the range-Doppler antenna cube).

At block 410, the signal processor 110 performs DDM decoding of the range-Doppler antenna cube based on the FFT or DFT output matrices generated by the per-channel DOA estimation performed at block 408 to generate a decoded RDBM.

At block 412, the signal processor 110 constructs a virtual MIMO array based on the decoded RDBM and the range-Doppler antenna cube. At block 414, the signal processor 110 generates object position data based on DOA estimation using the virtual MIMO array. As described herein, this data processing step may be implemented using the present approach for fastBLRC to reduce memory storage and computer processing power requirements when performing DOA estimation.

Finally, at block 416, signal processor 110 generates object tracking data based on the object position data.

As described herein, the present disclosure provides an automotive radar system with sparse-array super-resolution capability arranged to achieve high-resolution object detection with reduced compute and memory storage requirements enabled by the present fastBLRC angle estimation algorithm. The present fastBLRC processing algorithm is configured to receive as input the processed MIMO virtual array measurement beam vector (e.g., generated at block 412 of method 400). The output of the fastBLRC algorithm, as described herein is a set of high-resolution angular spectra in which objects are detected, as signified by distinct peaks in the spectra.

Specifically, the location of the peaks in the spectra output by the present fastBLRC algorithm signifies the DOA of a detected object and the magnitude of the peaks signifies the reflection power from the detected object, proportional to the radar cross section (RCS) of the detected object. The angle and power information of detected objects, combined with their range and radial velocity information, can be used to form a multi-dimensional radar point cloud output that can be used for object tracking and classification (e.g., in accordance with block 416 of method 400) or by perception stack software for modelling a driving environment for safely controlling a vehicle such as for the Advanced Diver's Assistance System (ADAS) and Highly Autonomous Driving (HAD) applications.

In conventional vehicle radar systems, BLRC algorithms have been used in DOA estimation processes. However, as described above, such algorithms have substantial memory and computing power requirements. An example conventional approach will now be described with reference to an example radar system implementation have a one-dimensional (1D) antenna array with N elements. For DOA estimation purposes, the signal model of such a radar system may be modeled by the following expression:

$$y = Ac + n \tag{1}$$

In equation (1), $y \in \mathbb{C}^N$ is the radar signal measurement vector, which is equivalent to the MIMO virtual array measurement beam vector discussed above, and $n \in \mathbb{C}^N$ is the error vector. $A \in \mathbb{C}^{N \times M}$ is a steering matrix defined on a M-point frequency grid $\omega = [\omega_1, \omega_2, \ldots, \omega_M]$ (where M defines a number of bins of the angular spectrum of the radar system). The steering vector A represents a measurement vector of the antenna array for a specific direction of arrival. In the example radar system, the antenna positions relative to the first antenna element are arranged in a half-wavelength unit that forms a vector $p \in \mathbb{R}^N$. A is formed by M steering vectors $A = [a(\omega_1), a(\omega_2), \ldots, a(\omega_M)]$ in which the k-th column is the steering vector for frequency $\omega_k$ and M is equal to the number of bins of the angular spectrum at the output of the BLRC algorithm:

$$a(\omega_k) = \begin{bmatrix} e^{j\omega_k(p_1-1)} \\ e^{j\omega_k(p_2-1)} \\ \vdots \\ e^{j\omega_k(p_{N-1}-1)} \end{bmatrix} \tag{2}$$

In this configuration, the relationship between frequency a and the one-dimensional DOA of a detected object θ is defined as: $\omega(\theta) = 2\pi d \sin(\theta)$ where d is the unit of antenna spacing, which is defined as a half-wavelength, but may be different other radar systems. This wavelength is determined by the carrier signal frequency of the radar system. The carrier frequency usually is very high (e.g., around 77 GHz) and is much higher the ADC sampling frequency. The wavelength is therefore calculated as the speed light divided by the carrier signal frequency. After finding frequency peaks in the output spectrum, the DOAs of detected objects can be uniquely determined by $$\theta(\omega) = \sin^{-1}\left(\frac{\omega}{2\pi d}\right).$$

With reference to equation (1), $c \in \mathbb{C}^M$ is a vector of signal amplitudes for frequency bins of angular spectrum M. In order to perform DOA estimation, the values A and y are known, n is estimated. Given these conditions, the vector c is then estimated. In DOA estimation, however, the solution to the linear system $y = Ac + n$ is not unique and a sparse prior on c is usually applied to achieve super-resolution. When using a BLRC approach to estimate c, measurement error is modeled as a zero-mean Gaussian distribution with zero covariance and a variance parameter $$\sigma_n^2.$$

In that case, the likelihood function for BLRC estimation is expressed as:

$$p(y \mid c) = \left(\frac{1}{2\pi\sigma_n^2}\right)^{\frac{N}{2}} e^{-\frac{\|y - Ac\|^2}{2\sigma_n^2}} \tag{3}$$

The prior probability distribution of c can then be modeled as independent Cauchy distributions with a shared parameter τ:

$$p(c_i) = \frac{\sqrt{\tau}}{\pi\left(1 + \tau|c_i|^2\right)},\ i = 1, \ldots, M \tag{4}$$

Furthermore, the joint prior distribution p(c) can be expressed as:

$$p(c) = \prod_{i=1}^{M} \frac{\sqrt{\tau}}{\pi\left(1 + \tau|c_i|^2\right)} \tag{5}$$

The solution of c can then be determined by maximizing the log posterior probability:

$$\hat{c} = \mathrm{argmax}_c \ln p(c \mid y) = \mathrm{argmax}_c \ln \frac{p(y \mid c)p(c)}{p(y)} = \mathrm{argmax}_c[\ln p(y \mid c) + \ln p(c)] \tag{6}$$

In this approach, however, because there is no closed-form algorithm to find the optimal value of c, by applying an Expectation-Maximization (EM) method it is possible to iteratively optimize a solution comprising the estimated values c, $$\sigma_n^2$$

and τ such that the posterior probability p(c|y) is increased. When iteratively performing such an estimation, the BLRC algorithm is configured to finish when a user-specified convergence criteria is satisfied.

To illustrate such an approach, FIG. 5 is a flow chart depicting a method 500 for implementing a BLRC algorithm. Method 500 may be implemented by any suitably configured processor or controller such as radar controller 108, signal processor 110 of MCU 104 or combinations thereof. At block 502, an initialization process is followed in which an output amplitude vector $$c = \frac{1}{N} A^H y$$

is initialized as an initial estimation of c, where $A^H$ is the Hermitian representation of the steering matrix $A \in \mathbb{C}^{N \times M}$ and y is the measurement vector $y \in \mathbb{C}^N$. An initial scaling factor τ is determined as well as the initial noise variance $$\sigma_n^2.$$

The scaling factor and noise variance are well-understood parameters of the BLRC algorithm. The noise variance describes reconstruction error while the scaling factor describes sparsity of the output. During implementations of the BLRC algorithm, a user specifies proper initial values for the two parameters and the algorithm updates the two parameters in every iteration until the algorithm converges, as described below. In this block, additional parameter values are defined such as a maximum number of iterations L, a convergence threshold for c $c_{TH}$ (i.e., this determines when the BLRC algorithm finishes), an initial factor for noise variance:

$$\sigma_0^2,$$

and an initial factor for Cauchy distribution: $\tau_0$.

With those values initialized, at block 504, a diagonal loading vector q is generated from the initialized output amplitude vector c according to the expression $$q = 2\sigma_n^2 \tau.$$

$[(1+\tau|c_1|^2)^{-1}, \ldots, (1+\tau|c_M|^2)^{-1}]$ and at block 506 the covariance matrix c is updated given y according to the expression $$\Omega = \sigma_n^2\left[A^H A + \mathrm{diag}(q)\right]^{-1},$$

where Ω is the covariance matrix for c given y. Note that this step requires significant computing power and memory storage capabilities as it requires the multiplication of two large matrices $-A^H A$. At block 508 the amplitude vector c is updated according to the expression $$c = \frac{1}{\sigma_n^2} \Omega\left(A^H y\right).$$

At blocks 510 and 512 a determination is made as to whether the estimation algorithm has converged and should therefore exit. Specifically, at block 510 the normalized difference $c_{diff}$ is calculated according to the expression $c_{diff} = \|c - c_{prev}\| / \|c_{prev}\|$ to determine a magnitude difference between the current estimation of the amplitude vector c and the magnitude of the vector in the immediately preceding iteration of the estimation algorithm $c_{prev}$. The magnitude of the normalized difference value is indicative of how quickly the method is converging. At block 512 the normalized difference value is compared to a threshold difference value $C_{TH}$. If the normalized difference value is less than the threshold, that indicates that the algorithm has converged. In that case, the algorithm exits and the current value of the output amplitude vector c is output at block 514.

If, however, the normalized difference value is not less than the threshold value, that indicates that the algorithm has not converged and further iterations are required. As such, method 500 moves on to block 516 in which the noise variance parameter $$\sigma_n^2$$

is updated accordance to the expression $$\sigma_n^2 = \frac{1}{2} \cdot \frac{\|y - Ac\|^2}{N - tr\left(I_M - \frac{1}{\sigma_n^2}\Omega \text{diag}(q)\right)}$$

and at block 518 the scaling parameter τ is updated according to the expression $$\tau = \frac{M}{2}\left[\sum_{i=1}^{M} \frac{\tau^2(\Omega_{ii} + |c_i|^2)^3 + 2\tau|c_i|^2 + \Omega_{ii} + |c_i|^2}{1 + \tau(\Omega_{ii} + |c_i|^2)^3}\right]^{-1}.$$

After updated the scaling parameter at block 518, method 500 returns to block 504 to again update the diagonal loading vector.

As such, method 500 executes an iterative loop continually re-estimating the amplitude vector c until the method converges and the normalized difference falls below the threshold value that triggers the method exiting.

Method 500 of FIG. 5 depicts a method for implementing a BLRC algorithm as part of a DOA estimation process. Specifically, the operation at block 506 involves the inversion of the M×M matrix $A^H A + \text{diag}(q)$, which requires $\mathcal{O}(M^3)$ computation and $\mathcal{O}(M^2)$ memory resources. For high-resolution radar implementations, for example, the frequency grid size M is usually large (e.g. 512), which requires high computation cost and may not fit into the memory of typical edge computing hardware.

To mitigate these challenges, FIG. 6 is a flow chart depicting an optimized fastBLRC method 600. FastBLRC method 600 may be implemented by any suitably configured processor or controller such as radar controller 108, signal processor 110 of MCU 104 or combinations thereof. As illustrated by FIG. 6, fastBLRC method 600 makes use of Fast Fourier Transform (FFT) equivalent operations to reduce requirements for large matrix operations. This can reduce computation power and memory storage requirements. Furthermore, such FFT operations can be directly benefitted from any available FFT hardware accelerator available in the device executing fastBLRC method 600. Another distinctive feature of method 600 is the inversion operation, which operates on a much smaller N×N matrix comparing with the larger M×M matrix inversion in original BLRC.

Referring to FIG. 6, therefore, at block 602, an initialization process is executed in which an output sparse-filled amplitude vector $$c = \frac{1}{N}$$

fft(sparse_fill(y, p), M) is initialized using a function named sparse_fill( ) (described in more detail, below), where N is the number of virtual radar system generating the data being process, M is the number of bins of the angular spectrum of the output of method 600, y is the measurement vector $y \in \mathbb{C}^N$, and p is a vector describing the virtual antenna positions of the radar system Virtual $\mathbb{C}^N$ antenna positions: $p \in \mathbb{Z}^N$. In this block, additional parameter values may be defined such as a maximum number of iterations L, a convergence threshold for c $c_{TH}$, an initial factor for noise variance:

$$\sigma_0^2,$$

and an initial factor for Cauchy distribution: $\tau_0$.

With those values initialized, at block 604, the diagonal loading vector q is updated according to the expression $$q = 2\sigma_n^2\tau \cdot \left[(1 + \tau|c_1|^2)^{-1}, \ldots, (1 + \tau|c_M|^2)^{-1}\right].$$

At block 606 an inverse of the diagonal loading vector q is calculated according to the expression $$q^{-1} = [q_1^{-1}, q_2^{-1}, \ldots, q_M^{-1}].$$

The inversion process of block 606 is neither memory nor computer power intensive.

At block 608 a weight matrix R is calculated using the inverted diagonal loading vector $q^{-1}$. The weight matrix R can be interpreted as the weighted covariance of rows of the steering matrix A with the $q^{-1}$ vector as the weights. In this implementation, however, as used in BLRC, the definition of the matrix R is of diminished importance as the matrix R only appears as part of the right side of the Woodbury matrix identity. Consequently, R may simply be defined as $AQ^{-1}A^H$. In an embodiment, R is calculated using the function compute_weighted_cov($q^{-1}$, p). Pseudocode for the compute_weighted_cov( ) function is provided in Table 2. The process for computing the weight matrix R is described in more detail below. With the weight matrix R calculated, at block 610 a matrix inverse C is calculated according to the following expression $C=(I_N+R)^{-1}$ as part of the implementation of the Woodbury matrix identity result. The amplitude vector c is then updated at block 610 according to the expression $c=q^{-1}\circ(A^H y)^{-1}\circ$fft(sparse_fill(C(Ry), p), M). The function sparse_fill( ) is described in more detail below along with example pseudocode. This step is described in more detail below.

At block 614 the normalized difference $c_{diff}$ is calculated according to the expression $c_{diff}=\|c-c_{prev}\|/\|c_{prev}\|$ to determine a magnitude difference between the current estimation of the amplitude vector c and the value of the vector in the immediately preceding iteration of the estimation algorithm $c_{prev}$. The magnitude of the normalized difference value is indicative of how quickly the EM method is converging. At block 616 the normalized difference value is compared to a convergence threshold difference value $C_{TH}$. If the normalized difference value is less than the convergence threshold, that indicates that the algorithm has converged and the current value of the output amplitude vector c is output at block 618.

If, however, the normalized difference value is not less than the threshold value, that indicates that the algorithm has not converged. As such, method 600 moves on to block 620 a value of y is estimated by inverse FFT (IFFT) using the updated amplitude vector c according to the expression $\hat{y}$=M·sparse_extract(ifft(c), p). At block 622, the diagonal elements d are calculated according to the expression d=diag ($A^H CA$) by FFT and the diagonal vector g of Ω is calculated according to the expression $$g = \sigma_n^2 (q^{-1} - q^{-1} \circ d \circ q^{-1}).$$

This step is described in more detail below.

At block 624 the noise parameter $$\sigma_n^2$$

is updated according to the expression $$\sigma_n^2 = \frac{1}{2} \cdot \frac{\|y - \hat{y}\|^2}{N - \sum_{i=1}^{M} q_i^{-1} d_i}$$

and the scaling parameter τ is updated in block 626 according to the expression $$\tau = \frac{M}{2}\left[\sum_{i=1}^{M} \frac{\tau^2 (g_i + |c_i|^2)^3 + 2\tau|c_i|^2 + g_i + |c_i|^2}{1 + \tau (g_i + |c_i|^2)^3}\right]^{-1}.$$

Method 600 then returns to block 604 to again update the diagonal loading vector. As such, method 600 executes an iterative loop continually re-estimating the amplitude vector c until the method converges and the normalized difference falls below the threshold value that triggers the method exiting.

The computational complexity of each iteration of fastBLRC method 600 is $\mathcal{O}$(4M log M+$N^3$), which is dominated by M-point FFT/inverse FFT operations of blocks 602, 622 and the inversion of the relatively small N×N matrix $I_N$+R of block 610. The memory requirement of method 600 is therefore $\mathcal{O}$($N^2$+M). And, as such, the computational and memory requirement of fastBLRC method 600 is significantly lower than the original BLRC algorithm of FIG. 5, given the number of antenna elements N is much smaller than the frequency grid size M.

FastBLRC method 600 generates comparable results to the BLRC approach of FIG. 5 given certain starting conditions. These conditions are typical in automotive radar system applications, so may be likely to exist in those applications relying on the fastBLRC method 600. Specifically, method 600 requires that the spacing (e.g., distance apart) of virtual antenna positions of the MIMO antenna array be integer multipliers of a unit spacing value (e.g. half the wavelength of the signals transmitted by the radar system. As such, in method 600, above, the position vector p is a vector of non-negative integers. Additionally, fastBLRC method 600 requires that the (spatial) frequency grid be a uniform grid spanning [0 radians, 2*π radians]. As such an M-point full uniform frequency grid is defined as:

$$\omega = \left\{2\pi \frac{k-1}{M} | k = 1, 2, \ldots, M\right\}.$$

Here, spatial frequencies map to physical DOAs based on the unit spacing of the radar system's MIMO array.

In fastBLRC method 600, the amplitude vector c is initialized from $A^H$y, which is the correlation of each steering vector and the measurement vector y. Under integer-spacing and full uniform grid condition (i.e., the conditions required for fastBLRC method 600 to be most effective), the steering matrix A can be formed by removing rows from a discrete Fourier transform (DFT) matrix corresponding to missing antenna elements, which enables FFT optimization for vector left multiplied by A or $A^H$. For a given virtual array, for example, the positions of the array elements can be used as indices into rows of a DFT matrix. Rows that are not in the index set are removed. The rows to remove are determined by the virtual array pattern.

Computation of $A^H$y for any vector y can be written as:

$$(A^H y)_k = \sum_{i=1}^{N} y_i e^{2\pi j (p_i - 1)\frac{k-1}{M}} = \sum_{i=1}^{L} z_i e^{2\pi j (i-1)\frac{k-1}{M}} = \mathcal{F}_k(z), \quad k = 1, \ldots, M \tag{7}$$

In expression (7), L=$\max_i(p_i)$ and z is a vector filled with values from y in positions specified by p as in the following expression:

$$z_i = \begin{cases} y_k & \text{if } p_k = i \\ 0 & \text{otherwise} \end{cases}, i = 1, \ldots, L \tag{8}$$

$\mathcal{F}_k$ (z) is the k-th element of FFT result of z.

The formation of z (or sparse filling the measurement vector based on the antenna locations) is implemented using the pseudo code presented below with respect to Table 1. The pseudocode of the sparse_fill( ) function may be used to perform the step of block 612, described above with respect to fastBLRC method 600. As depicted, the vector z is generated by executing a loop iteratively from index value 1 to index value N (i.e., the number of virtual antennas) in values in vector z for the current index value are set equal to the values in the measurement vector for the same index value.

TABLE 1

```
Function sparse_fill
Input:
  Measurement vector: y ∈ ℂ^N
  Virtual antenna positions: p ∈ ℤ^N
Output:
  Filled measurement vector: z ∈ ℂ^K
Initialization:
  L = max_i(p_i)
  z = 0_L
1                       for i = 1: N do
2                         z_{p_i} = y_i
```

As noted above, the computational cost of the original BLRC algorithm (depicted in FIG. 5) is dominated by the inversion of a M×M matrix $A^H$A+diag(q) (e.g., at block 506 of FIG. 5), which requires $\mathcal{O}$($M^3$) computation and $\mathcal{O}$($M^2$) memory. However, in accordance with the present fastBLRC method 600, because the diagonal loading matrix Q is equal to diag(q), by applying the Woodbury matrix identity, the computation of $(A^H A+Q)^{-1}$ can be reduced to inversion of $I_N+AQ^{-1}A^H$ which is a N×N matrix, much smaller (e.g. 32×32) than the original M×M matrix and requiring less computationally-intensive matrix operations. This identity can be expressed as follows:

$$\left(A^H A + Q\right)^{-1} = Q^{-1} - Q^{-1}A^H\left(I_N + AQ^{-1}A^H\right)^{-1}AQ^{-1} \quad (9)$$

On the right side of the Woodbury matrix identity of expression (9), the weight matrix R may be expressed as $AQ^{-1}A^H$. Explicit computation of R requires $\mathcal{O}(N^2M+NM)$ using matrix multiplications.

The present FastBLRC method 600 includes further modification to improve the algorithm's efficiency, as noted below, which reduce the requirement for computer and memory-intensive matrix-matrix multiplications and replace those functions with lower overhead FFT-equivalent operations. This is achieved by further exploiting the fact that the matrix A is a DFT matrix with a subset of rows deleted, such that one may optimize the computation of R by FFT.

Specifically, it is noted that in this case the matrix $R=AQ^{-1}A^H$ is a Hermitian Toeplitz matrix because values of R satisfy the following expression:

$$R_{ik} = \sum_{m=1}^{M} q_i^{-1} e^{2\pi j(p_i - p_k)\frac{m-1}{M}},\ i, k = 1, \ldots, N \quad (10)$$

Expression (10) satisfies $R_{ik}=R_{(i+s),(k+s)}$ and $$R_{ik} = R_{ki}^*.$$

As such, only (2N+1) values (i.e., the first row and the first column) are needed to create a N×N Toeplitz matrix. Further, because R is also Hermitian (This is true because $Q^{-1}$ is a symmetric matrix, which can be verified by a property of Hermitian matrices: $R^H$ $(AQ^{-1}A^H)^H=(A^H)^H$ $(Q^{-1})^H A^H=AQ^{-1}A^H=R$), only the first row (having only N values) is computed because other rows can be computed from the first row. Further optimization can be realized by observing that the first row of R can be written as a M-point DFT:

$$R_{1k} = \sum_{m=1}^{M} q_i^{-1} e^{-2\pi j(p_k - p_1)\frac{m-1}{M}},\ k = 1, \ldots, N \quad (11)$$

Additionally, diagonals of $Q^{-1}$ are denoted as $$q^{-1} = \mathrm{diag}\left(Q^{-1}\right) = \left[q_1^{-1}, q_2^{-1}, \ldots, q_M^{-1}\right].$$

An FFT can then be applied to $q^{-1}$ to determine $r=F(q^{-1})\in\mathbb{C}^M$. Values can be extracted from r with subscripts equal to $(p_k-p_1)$. The matrix R can then be created from values or conjugate complex of values of r:

$$R = \begin{bmatrix} r_1 & r_{p_2-p_1+1} & r_{p_3-p_1+1} & \cdots & r_{p_N-p_1+1} \\ r^*_{p_2-p_1+1} & r_1 & r_{p_3-p_2+1} & \cdots & r_{p_N-p_2+1} \\ r^*_{p_3-p_1+1} & r^*_{p_3-p_2+1} & r_1 & \cdots & r_{p_N-p_3+1} \\ \vdots & \vdots & \vdots & \ddots & \vdots \\ r^*_{p_N-p_1+1} & r^*_{p_N-p_2+1} & r^*_{p_N-p_3} & \cdots & r_1 \end{bmatrix} \quad (12)$$

-continued $$R = \begin{bmatrix} r_1 & r_{p_2-p_1+1} & r_{p_3-p_1+1} & \cdots & r_{p_N-p_1+1} \\ r^*_{p_2-p_1+1} & r_1 & r_{p_3-p_2+1} & \cdots & r_{p_N-p_2+1} \\ r^*_{p_3-p_1+1} & r^*_{p_3-p_2+1} & r_1 & \cdots & r_{p_N-p_3+1} \\ \vdots & \vdots & \vdots & \ddots & \vdots \\ r^*_{p_N-p_1+1} & r^*_{p_N-p_2+1} & r^*_{p_N-p_3} & \cdots & r_1 \end{bmatrix}$$

If L>M, the DFT result is periodic for k>M. In this expression, L is the maximum value of p. L is defined as in Table 1, above. k is an index of p ($p_k$ is the k-th element of p). In that case, instead of extracting $r_{P_k-P_1+1}$, $r_{\lfloor (P_k-P_1)/M+1 \rfloor}$ is extracted.

Pseudocode for this process is depicted in Table 2 for the function compute_weighted_cov( ). The presented pseudocode may be used to implement block 608 of FIG. 6, above. As depicted, the compute_weighted_cov function executes an iterative loop that computes the weighted covariance matrix (Hermitian): $R\in\mathbb{C}^{N\times N}$ as $AQ^{-1}A^H=A\mathrm{diag}(q^{-1})A^H$ where $A\in\mathbb{C}^{N\times M}$ is a steering matrix on a uniform frequency grid [0,2π) with M points. $\mathbb{C}^{N\times M}$

TABLE 2

```
Function: compute_weighted_cov
Input:
  Hermitian matrix: q^-1 ∈ ℝ^M
  Virtual antenna positions: p ∈ ℤ^N
Output:
  Weighted covariance matrix (Hermitian): R ∈ ℂ^(N×N)
1       r = fft(q^-1)
2       for n = 1: M do
3         for m = 1: M do
4           if m < n then
5             k = p_m − p_n + M + 1
6           else
7             k = p_m − p_n + 1
8           R_n,m = r_k
```

When executing the present fastBLRC method 600, the amplitude vector c is periodically updated (e.g., in accordance with block 612 of FIG. 6. Using the Woodbury matrix identity, this updating operation can be expressed as follows:

$$c = \left(A^H A + Q\right)^{-1}\left(A^H y\right) = Q^{-1}\left(A^H y\right) - Q^{-1}A^H\left(I_N + AQ^{-1}A^H\right)^{-1}AQ^{-1}\left(A^H y\right) \quad (13)$$

Because $A^Hy$ (i.e., a vector of size M) is computed during initialization the value can be stored in device memory (e.g., a memory of MCU 104 of FIG. 1) and reused at each iteration. As such, $A^Hy$ does not need to be re-computed with each iteration of the fastBLRC method 600. Furthermore, the amplitude vector c is computed by a series of matrix-vector multiplications and vector-vector subtraction from right to left. Any vector multiplied by $Q^{-1}$ is an elementwise vector multiplication because $Q^{-1}$ is a diagonal matrix, which is an operation with relatively low compute and data storage requirements. Furthermore, matrix-vector multiplications in the form of $A^Hx$ or Ax can be optimized using FFT. Computation of $A^Hx$ has is described above. $R=AQ^{-1}A^H$ and $C=(I_N+R)^{-1}$ are already computed as above. Consequently, an optimized formula for updating c may be expressed as:

$$c = q^{-1} \circ \left(A^H y\right) - q^{-1} \circ fft(\text{sparse\_fill}(C(Ry), p), M) \quad (14)$$

In a similar manner, the computing of the estimate of y of block 620 of FIG. 6 can be optimized. Specifically, similarly to the computation of $A^H x$, Ax for any vector x can be written as:

$$(Ax)_k = \sum_{i=1}^{M} x_i e^{-2\pi j (p_k - 1)\frac{i-1}{M}}, \tag{15}$$

$$k = 1, \ldots, N = \sum_{i=1}^{M} x_i e^{-2\pi j (l-1)\frac{i-1}{M}} = M \cdot \mathcal{F}_l^{-1}(c),\ l = p_1, \ldots, p_N$$

$$(Ax)_k = \sum_{i=1}^{M} x_i e^{-2\pi j (p_k - 1)\frac{i-1}{M}},$$

$$k = 1, \ldots, N = \sum_{i=1}^{M} x_i e^{-2\pi j (l-1)\frac{i-1}{M}} = M \cdot \mathcal{F}_l^{-1}(c),\ l = p_1, \ldots, p_N$$

In equation (15), $$\mathcal{F}_l^{-1}(x)$$

is the 1-th element of inverse FFT result of x. After applying inverse FFT on c, Ac is obtained by extracting values from $$M \cdot \mathcal{F}_l^{-1}(x)$$

using indices specified by p. The pseudocode for extracting elements from the inverse FFT result with the function sparse_extract( ) is described, below, in Table 3.

TABLE 3

```
Function sparse_extract
Input:
  Filled measurement vector: z ∈ ℂ^K
  Virtual antenna positions: p ∈ ℤ^N
Output:
  Extracted measurement vector: y ∈ ℂ^N
1        for i = 1: N do
2          y_i = z_{p_i}
```

By using IFFT, the estimate of y is expressed as:

$$\hat{y} = M \cdot \text{sparse\_extract}(ifft(c), p) \tag{16}$$

As described above, with respect to blocks 624 and 626 of FIG. 6, the updating of the scaling parameter τ requires only diagonals of Ω and it is the same case for updating the noise variance parameter $$\sigma_n^2$$

because $$tr(\Omega \text{diag}(q)) = \sum_{i=1}^{M} q_i \Omega_{ii}.$$

After Woodbury transformation, therefore, the covariance matrix $\Omega = [A^H A + \text{diag}(q)]^{-1}$ does not need to be computed explicitly and only diagonal elements of $A^H(I_N + AQ^{-1}A^H)^{-1}A$ need to be computed because $Q^{-1}$ is a diagonal matrix. The diagonals of a matrix multiplied by a diagonal matrix can be computed with low computational and memory overhead by multiplying the diagonals of the matrix by the diagonal matrix, with relatively low computing power and memory storage requirements. Accordingly, $C = (I_N + AQ^{-1}A^H)^{-1}$ and diagonal vector $d = \text{diag}(A^H CA)$. The m-th diagonal element can then be written as quadratic form of $a_m$ which is the m-th column of A, as follows:

$$d_m = a_m^H C a_m = \sum_{i=1}^{N} \sum_{k=1}^{N} C_{ik} e^{-2\pi j (p_i - p_k)\frac{m-1}{M}},\ m = 1, \ldots, M \tag{17}$$

It should be noted that $d_m$ can also be written as a polynomial $$f(z) = \sum_{n=-L}^{L} t_n z^{n-1}$$

evaluated with $$z = e^{-2\pi j \frac{m-1}{M}},$$

as follows:

$$\begin{aligned} d_m &= \sum_{i=1}^{N} \sum_{k=1}^{N} C_{ik} e^{-2\pi j (p_i - p_k)\frac{m-1}{M}} \\ &= \sum_{i=1}^{N} \sum_{k=1}^{N} \sum_{n=-(L-1)}^{L-1} C_{ik} e^{-2\pi j n \frac{m-1}{M}} \delta[n - (p_i - p_k)] \\ &= \sum_{n=-(L-1)}^{L-1} e^{-2\pi j n \frac{m-1}{M}} \sum_{i=1}^{N} \sum_{k=1}^{N} C_{ik} \delta[n - (p_i - p_k)] \\ &= \sum_{n=-(L-1)}^{L-1} e^{-2\pi j n \frac{m-1}{M}} t_n = f(e^{-2\pi j \frac{m-1}{M}}),\ m = 1, \ldots, M \end{aligned} \tag{18}$$

In equation (18), where $L = \max_i(p_i)$, δ(x) is the indicator function:

$$\delta(x) = \begin{cases} 1 & x = 0 \\ 0 & \text{otherwise} \end{cases} \tag{19}$$

$t_n$ are the coefficients of the following polynomial:

$$t_n = \sum_{i=1}^{N} \sum_{k=1}^{N} C_{ik} \delta[n - (p_i - p_k)],\ n = -(L-1), \ldots, (L-1) \tag{20}$$

$t_n$ can also be understood as sum of elements of C with subscripts satisfying $n = (p_i - p_k)$.

Because $$e^{-2\pi j n \frac{m-1}{M}}$$

is a root unity which satisfies $$e^{-2\pi j n \frac{m-1}{M}} = e^{-2\pi j (n+M)\frac{m-1}{M}},$$

we can create a vector $\tilde{t} = [t_0, t_1, \ldots, t_{L-1}, 0, \ldots, 0, t_{-(L-1)}, t_{-(L-2)}, \ldots, t_{-1}]^T \in \mathbb{C}^M$. Then d can be computed by applying DFT to t as follows:

$$d_m = \sum_{n=1}^{M} \tilde{t}_n e^{-2\pi j(n-1)\frac{m-1}{M}} = F_m(\tilde{t}) \quad (21)$$

If 2L−1>M, zero-filling may not be needed to create vector $\tilde{t}=[t_0, t_1, \ldots, t_L, t_{-L}, t_{-L+1}, \ldots, t_{-1}]^T \in \mathbb{C}^{2L-1}$ and then a (2L−1)-point FFT is applied and only the first M values of the FFT result is used to create d. If C is Hermitian, then coefficients $$t_n = t_{-n}^*$$

and only to with non-negative subscripts may be required to compute d as follows:

$$\begin{aligned} d_m &= \sum_{n=0}^{L-1} t_n e^{-2\pi jn\frac{m-1}{M}} + \sum_{n=-(L-1)}^{-1} t_n e^{-2\pi jn\frac{m-1}{M}} \\ &= \sum_{n=0}^{L-1} t_n e^{-2\pi jn\frac{m-1}{M}} + \sum_{n=1}^{L-1} t_n^* e^{2\pi jn\frac{m-1}{M}} \\ &= -t_0 + \sum_{n=0}^{L-1} [t_n e^{-2\pi jn\frac{m-1}{M}} + (t_n e^{-2\pi jn\frac{m-1}{M}})^*] \\ &= -t_0 + \sum_{n=0}^{L-1} 2 \cdot \mathrm{Re}\left(t_n e^{-2\pi jn\frac{m-1}{M}}\right) \\ &= -t_0 + 2 \cdot \mathrm{Re}\left(\sum_{n=0}^{L-1} t_n e^{-2\pi jn\frac{m-1}{M}}\right) \\ &= -t_0 + 2 \cdot \mathrm{Re}[F_m(\tilde{t})],\ m = 1, \ldots, M \end{aligned} \quad (22)$$

In equation (22), $\tilde{t}=[t_0, t_1, \ldots, t_{L-1}, 0, \ldots, 0] \in \mathbb{C}^M$ is a vector with zero-padding if L<M and $\tilde{t}=[t_0, t_1, \ldots, t_{L-1}] \in \mathbb{C}^L$ if L≥M. When L<M, the M-point FFT with zero padding could require less computation than a full M-point FFT. It also requires only half of the computation for computing $\tilde{t}$. A pseudocode implementation of this procedure is provided in Table 4, below.

TABLE 4

```
Function: compute_diagonals
Description:
  Compute diagonal elements d = diag(A^H CA) where A ∈ ℂ^(N×M) is a steering matrix on a
uniform frequency grid [0,2π) with M points. C is a Hermitian matrix.
Input:
  Hermitian matrix: C ∈ ℂ^(N×N)
  Virtual antenna positions: p ∈ ℂ^M
Output:
  Diagonal elements: d ∈ ℂ^M
Initialization:
  t = 0_M
1        for n = 1: N do
2          for m = 1: N do
3            if p_m > p_n then
6              k = p_m − p_n + 1
7            t_k = t_k + C_(m,n)
8        d = −t_1 + 2·Re(fft(t))
```

Define $$g = \mathrm{diag}(\sigma_n^2 \Omega),$$

which can be computed efficiently from d and $q^{-1}$ according to the following expression:

$$g = \sigma_n^2 \mathrm{diag}(Q^{-1} - Q^{-1}(A^H CA)Q^{-1}) = \sigma_n^2(q^{-1} - q^{-1} \circ d \circ q^{-1}) \quad (23)$$

In expression (23), ∘ is elementwise vector product. The update formula of $$\sigma_n^2$$

becomes:

$$\begin{aligned} \sigma_n^2 &= \frac{1}{2} \cdot \frac{\|y - \hat{y}\|^2}{N - tr\left(I_M - \frac{1}{\sigma_n^2}\Omega \mathrm{diag}(q)\right)} \\ &= \frac{1}{2} \cdot \frac{\|y - \hat{y}\|^2}{N - M + tr((q^{-1} - q^{-1} \circ d \circ q^{-1}) \circ q)} \\ &= \frac{1}{2} \cdot \frac{\|y - \hat{y}\|^2}{N - \sum_{i=1}^{M} q_i^{-1} d_i} \end{aligned} \quad (24)$$

In some aspects, the techniques described herein relate to a radar system including: a plurality of transmitter modules configured to transmit a plurality of transmitted radar signals, wherein each transmitted radar signal is associated with a transmit channel of a plurality of transmit channels; a plurality of receiver modules configured to receive reflections of the plurality of transmitted radar signals reflected by at least one object and to generate signals based on the received reflections; and a signal processor configured to: determine a steering matrix for the radar system, wherein the steering matrix defines a plurality of steering vectors, wherein each steering vector in the plurality of steering vectors is associated with a frequency, determine a measurement vector using signals received by the plurality of receiver modules, initializing an output amplitude vector using the steering matrix and the measurement vector; determine an optimized output amplitude vector by performing steps including: determining a diagonal loading vector using the output amplitude vector; calculating a weighting matrix by executing a first fast Fourier transform using the diagonal loading vector, determining an inverse matrix as an inversion of a sum of the weighting matrix and an identity matrix; executing a second fast Fourier transform using the inverse matrix to determine the optimized output amplitude vector, wherein the optimized output amplitude vector is determined by a relationship between the steering matrix and the measurement vector; and determine an estimated direction of arrival of a first object by correlating the optimized output amplitude vector to the measurement vector.

In some aspects, the techniques described herein relate to a radar system, wherein the signals received by the plurality of receiver modules are associated with a MIMO virtual array in which antenna elements are evenly spaced from one another by a multiple of a unit value, wherein the identity matrix has dimensions N×N where N is equal to a number of the antenna elements in the MIMO virtual array.

In some aspects, the techniques described herein relate to a radar system, wherein the unit value is equal to half of a wavelength of the signals received by the plurality of receiver modules.

In some aspects, the techniques described herein relate to a radar system, wherein the steering matrix is defined on an M-point frequency grid, where M is equal to a number of bins of an angular resolution of the radar system.

In some aspects, the techniques described herein relate to a radar system, wherein the M-point frequency grid is a uniform frequency grid spanning from 0 radians to 2*π radians.

In some aspects, the techniques described herein relate to a radar system, wherein the signal processor, to initialize the output amplitude vector, is configured to determine a sparse-filled measurement vector by extracting values from the measurement vector that correspond to antennas in the MIMO virtual array.

In some aspects, the techniques described herein relate to a radar system, wherein the signal processor, to initialize the output amplitude vector, is configured to perform vector multiplication of the steering matrix and the sparse-filled measurement vector.

In some aspects, the techniques described herein relate to a radar system, wherein the relationship between the steering matrix and the measurement vector is of the form, wherein y is the measurement vector, A is the steering vector, c is the optimized output amplitude vector, and n is a noise factor.

In some aspects, the techniques described herein relate to a radar system including: a plurality of transmitter modules configured to transmit a plurality of transmitted radar signals, wherein each transmitted radar signal is associated with a transmit channel of a plurality of transmit channels; a plurality of receiver modules configured to receive reflections of the plurality of transmitted radar signals reflected by at least one object and to generate signals based on the received reflections; and a signal processor configured to: determine a steering matrix for the radar system, wherein the steering matrix defines a plurality of steering vectors, wherein each steering vector in the plurality of steering vectors is associated with a frequency, determine a measurement vector using signals received by the plurality of receiver modules, initializing a first output amplitude vector using the steering matrix and the measurement vector; determine a second output amplitude vector by performing steps including: determining a diagonal loading vector using the first output amplitude vector; calculating a weighting matrix by executing a first fast Fourier transform using the diagonal loading vector, determining an inverse matrix as an inversion of a sum of the weighting matrix and an identity matrix; and executing a second fast Fourier transform using the inverse matrix to determine the second output amplitude vector, wherein the second output amplitude vector is determined by a relationship between the steering matrix and the measurement vector; determine a normalized difference between the second output amplitude vector and the first output amplitude vector is greater than a convergence threshold; executing an inverse fast Fourier transform to determine an estimate of the measurement vector using the second output amplitude vector; computing a set of diagonal elements by executing a fast Fourier transform using the inverse matrix; updating a noise parameter using the estimate of the measurement vector; updating a scaling parameter using the second output amplitude vector; determining a third output amplitude vector using the noise parameter and the scaling parameter; and determining an estimated direction of arrival of a first object by correlating the third output amplitude vector to the measurement vector.

In some aspects, the techniques described herein relate to a radar system, wherein the signals received by the plurality of receiver modules are associated with a MIMO virtual array in which antenna elements are evenly spaced from one another by a multiple of a unit value, wherein the identity matrix has dimensions N×N where N is equal to a number of the antenna elements in the MIMO virtual array.

In some aspects, the techniques described herein relate to a radar system, wherein the unit value is equal to half of a wavelength of the signals received by the plurality of receiver modules.

In some aspects, the techniques described herein relate to a radar system, wherein the steering matrix is defined on an M-point frequency grid, where M is equal to a number of bins of an angular resolution of the radar system.

In some aspects, the techniques described herein relate to a radar system, wherein the M-point frequency grid is a uniform frequency grid spanning from 0 radians to 2*π radians.

In some aspects, the techniques described herein relate to a radar system, wherein the signal processor, to initialize the output amplitude vector, is configured to determine a sparse-filled measurement vector by extracting values from the measurement vector that correspond to antennas in the MIMO virtual array.

In some aspects, the techniques described herein relate to a radar system, wherein the signal processor, to initialize the output amplitude vector, is configured to perform vector multiplication of the steering matrix and the sparse-filled measurement vector.

In some aspects, the techniques described herein relate to a radar system, wherein the relationship between the steering matrix and the measurement vector is of the form, wherein y is the measurement vector, A is the steering vector, c is the second output amplitude vector, and n is a noise factor.

In some aspects, the techniques described herein relate to a radar system, wherein the signal processor is configured to determine a second normalized difference between the third output amplitude vector and the second output amplitude vector is less than the convergence threshold.

In some aspects, the techniques described herein relate to a method, including: determining a steering matrix for a radar system, wherein the steering matrix defines a plurality of steering vectors, wherein each steering vector in the plurality of steering vectors is associated with a frequency, determining a measurement vector using signals received by a plurality of receiver modules, initializing an output amplitude vector using the steering matrix and the measurement vector; determine an optimized output amplitude vector by performing steps including: determining a diagonal loading vector using the output amplitude vector; calculating a weighting matrix by executing a first fast Fourier transform using the diagonal loading vector, determining an inverse matrix as an inversion of a sum of the weighting matrix and an identity matrix; executing a second fast Fourier transform using the inverse matrix to determine the optimized output amplitude vector, wherein the optimized output amplitude vector is determined by a relationship between the steering matrix and the measurement vector; and determining an estimated direction of arrival of a first object by correlating the optimized output amplitude vector to the measurement vector.

In some aspects, the techniques described herein relate to a method, wherein the signals received by the plurality of receiver modules are associated with a MIMO virtual array in which antenna elements are evenly spaced from one another by a multiple of a unit value, wherein the identity matrix has dimensions N×N where N is equal to a number of the antenna elements in the MIMO virtual array.

In some aspects, the techniques described herein relate to a method, further including, to initialize the output amplitude vector, determining a sparse-filled measurement vector by extracting values from the measurement vector that correspond to antennas in a MIMO virtual array of the radar system.

Although the examples have been described with reference to automotive radar systems, the systems and methods described herein may be implemented in conjunction with other types of radar systems.

The preceding detailed description is merely illustrative in nature and is not intended to limit the embodiments of the subject matter or the application and uses of such embodiments.

As used herein, the word “exemplary” means “serving as an example, instance, or illustration.” Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms “first,” “second” and other such numerical terms referring to structures do not imply a sequence or order unless clearly indicated by the context.

As used herein, a “node” means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being “connected” or “coupled” together. As used herein, unless expressly stated otherwise, “connected” means that one element is directly joined to (or directly communicates with) another element, and not necessarily mechanically. Likewise, unless expressly stated otherwise, “coupled” means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A radar system comprising:

a plurality of transmitter modules configured to transmit a plurality of transmitted radar signals, wherein each transmitted radar signal is associated with a transmit channel of a plurality of transmit channels;

a plurality of receiver modules configured to receive reflections of the plurality of transmitted radar signals reflected by at least one object and to generate signals based on the received reflections; and a signal processor configured to:

determine a steering matrix for the radar system, wherein the steering matrix defines a plurality of steering vectors, wherein each steering vector in the plurality of steering vectors is associated with a frequency, determine a measurement vector using signals received by the plurality of receiver modules, initializing an output amplitude vector using the steering matrix and the measurement vector;

determine an optimized output amplitude vector by performing steps including:

determining a diagonal loading vector using the output amplitude vector;

calculating a weighting matrix by executing a first fast Fourier transform using the diagonal loading vector, determining an inverse matrix as an inversion of a sum of the weighting matrix and an identity matrix;

executing a second fast Fourier transform using the inverse matrix to determine the optimized output amplitude vector, wherein the optimized output amplitude vector is determined by a relationship between the steering matrix and the measurement vector; and determine an estimated direction of arrival of a first object by correlating the optimized output amplitude vector to the measurement vector, wherein the signals received by the plurality of receiver modules are associated with a MIMO virtual array in which antenna elements are evenly spaced from one another by a multiple of a unit value, wherein the identity matrix has dimensions N×N where N is equal to a number of the antenna elements in the MIMO virtual array.

2. The radar system of claim 1, wherein the unit value is equal to half of a wavelength of the signals received by the plurality of receiver modules.

3. The radar system of claim 1, wherein the steering matrix is defined on an M-point frequency grid, where M is equal to a number of bins of an angular resolution of the radar system.

4. The radar system of claim 3, wherein the M-point frequency grid is a uniform frequency grid spanning from 0 radians to 2*π radians.

5. The radar system of claim 3, wherein the signal processor, to initialize the output amplitude vector, is configured to determine a sparse-filled measurement vector by extracting values from the measurement vector that correspond to antennas in the MIMO virtual array.

6. The radar system of claim 5, wherein the signal processor, to initialize the output amplitude vector, is configured to perform vector multiplication of the steering matrix and the sparse-filled measurement vector.

7. The radar system of claim 1, wherein the relationship between the steering matrix and the measurement vector is of the form y=Ac+n, wherein y is the measurement vector, A is the steering vector, c is the optimized output amplitude vector, and n is a noise factor.

8. A radar system comprising:

a plurality of transmitter modules configured to transmit a plurality of transmitted radar signals, wherein each transmitted radar signal is associated with a transmit channel of a plurality of transmit channels;

a plurality of receiver modules configured to receive reflections of the plurality of transmitted radar signals reflected by at least one object and to generate signals based on the received reflections; and a signal processor configured to:

determine a steering matrix for the radar system, wherein the steering matrix defines a plurality of steering vectors, wherein each steering vector in the plurality of steering vectors is associated with a frequency, determine a measurement vector using signals received by the plurality of receiver modules, initializing a first output amplitude vector using the steering matrix and the measurement vector;

determine a second output amplitude vector by performing steps including:

determining a diagonal loading vector using the first output amplitude vector;

calculating a weighting matrix by executing a first fast Fourier transform using the diagonal loading vector, determining an inverse matrix as an inversion of a sum of the weighting matrix and an identity matrix; and executing a second fast Fourier transform using the inverse matrix to determine the second output amplitude vector, wherein the second output amplitude vector is determined by a relationship between the steering matrix and the measurement vector;

determine a normalized difference between the second output amplitude vector and the first output amplitude vector is greater than a convergence threshold;

executing an inverse fast Fourier transform to determine an estimate of the measurement vector using the second output amplitude vector;

computing a set of diagonal elements by executing a fast Fourier transform using the inverse matrix;

updating a noise parameter using the estimate of the measurement vector;

updating a scaling parameter using the second output amplitude vector;

determining a third output amplitude vector using the noise parameter and the scaling parameter; and determining an estimated direction of arrival of a first object by correlating the third output amplitude vector to the measurement vector, wherein the signals received by the plurality of receiver modules are associated with a MIMO virtual array in which antenna elements are evenly spaced from one another by a multiple of a unit value, wherein the identity matrix has dimensions N×N where N is equal to a number of the antenna elements in the MIMO virtual array.

9. The radar system of claim 8, wherein the unit value is equal to half of a wavelength of the signals received by the plurality of receiver modules.

10. The radar system of claim 8, wherein the steering matrix is defined on an M-point frequency grid, where M is equal to a number of bins of an angular resolution of the radar system.

11. The radar system of claim 10, wherein the M-point frequency grid is a uniform frequency grid spanning from 0 radians to 2*π radians.

12. The radar system of claim 10, wherein the signal processor, to initialize the output amplitude vector, is configured to determine a sparse-filled measurement vector by extracting values from the measurement vector that correspond to antennas in the MIMO virtual array.

13. The radar system of claim 12, wherein the signal processor, to initialize the output amplitude vector, is configured to perform vector multiplication of the steering matrix and the sparse-filled measurement vector.

14. The radar system of claim 8, wherein the relationship between the steering matrix and the measurement vector is of the form y=Ac+n, wherein y is the measurement vector, A is the steering vector, c is the second output amplitude vector, and n is a noise factor.

15. The radar system of claim 8, wherein the signal processor is configured to determine a second normalized difference between the third output amplitude vector and the second output amplitude vector is less than the convergence threshold.

16. A method, comprising:

determining a steering matrix for a radar system, wherein the steering matrix defines a plurality of steering vectors, wherein each steering vector in the plurality of steering vectors is associated with a frequency, determining a measurement vector using signals received by a plurality of receiver modules, initializing an output amplitude vector using the steering matrix and the measurement vector;

determine an optimized output amplitude vector by performing steps including:

determining a diagonal loading vector using the output amplitude vector;

calculating a weighting matrix by executing a first fast Fourier transform using the diagonal loading vector, determining an inverse matrix as an inversion of a sum of the weighting matrix and an identity matrix;

executing a second fast Fourier transform using the inverse matrix to determine the optimized output amplitude vector, wherein the optimized output amplitude vector is determined by a relationship between the steering matrix and the measurement vector; and determining an estimated direction of arrival of a first object by correlating the optimized output amplitude vector to the measurement vector, wherein the signals received by the plurality of receiver modules are associated with a MIMO virtual array in which antenna elements are evenly spaced from one another by a multiple of a unit value, wherein the identity matrix has dimensions N×N where N is equal to a number of the antenna elements in the MIMO virtual array.

17. The method of claim 16, further comprising, to initialize the output amplitude vector, determining a sparse-filled measurement vector by extracting values from the measurement vector that correspond to antennas in a MIMO virtual array of the radar system.

* * * * *